United States Patent
Gong et al.

(10) Patent No.: US 9,834,479 B2
(45) Date of Patent: Dec. 5, 2017

(54) TAILORED GEOPOLYMER COMPOSITE BINDERS FOR CEMENT AND CONCRETE APPLICATIONS

(71) Applicant: The Catholic University of America, Washington, DC (US)

(72) Inventors: Weiliang Gong, Rockville, MD (US); Werner Lutze, Chevy Chase, MD (US); Ian Pegg, Alexandria, VA (US)

(73) Assignee: The Catholic University of America, Washington, DC (US)

( * ) Notice: Subject to any disclaimer, the term of this patent is extended or adjusted under 35 U.S.C. 154(b) by 0 days.

(21) Appl. No.: 14/960,770

(22) Filed: Dec. 7, 2015

(65) Prior Publication Data

US 2016/0152521 A1    Jun. 2, 2016

Related U.S. Application Data

(62) Division of application No. 13/138,233, filed as application No. PCT/US2010/021615 on Jan. 21, 2010, now abandoned.

(60) Provisional application No. 61/146,494, filed on Jan. 22, 2009.

(51) Int. Cl.
  *C04B 28/00* (2006.01)
  *C04B 7/24* (2006.01)
  *C04B 12/00* (2006.01)

(52) U.S. Cl.
  CPC ............ *C04B 28/006* (2013.01); *C04B 7/243* (2013.01); *C04B 12/005* (2013.01); *Y02P 40/145* (2015.11); *Y02P 40/165* (2015.11); *Y02W 30/92* (2015.05); *Y02W 30/94* (2015.05)

(58) Field of Classification Search
  CPC ...... C04B 28/006; C04B 7/243; C04B 12/005
  See application file for complete search history.

(56) References Cited

U.S. PATENT DOCUMENTS

| | | |
|---|---|---|
| 4,509,985 A | 4/1985 | Davidovits et al. |
| 4,640,715 A | 2/1987 | Heitzmann et al. |
| 4,642,137 A | 2/1987 | Heitzmann et al. |
| 5,435,843 A | 7/1995 | Roy et al. |
| 5,601,643 A | 2/1997 | Silverstrim et al. |
| 2005/0160946 A1 | 7/2005 | Comrie |
| 2007/0125272 A1 | 6/2007 | Johnson |
| 2008/0028995 A1* | 2/2008 | Barlet-Gouedard .. C04B 28/006 106/811 |
| 2010/0010139 A1 | 1/2010 | Davidovits et al. |

FOREIGN PATENT DOCUMENTS

| | | |
|---|---|---|
| DE | 3512516 A1 | 10/1986 |
| KR | 10-0622048 B1 | 9/2006 |
| KR | 10-2008-0072001 | 8/2008 |
| WO | WO 97/23427 A1 | 7/1997 |
| WO | WO 03/078349 A1 | 9/2003 |
| WO | WO 2005/019130 A1 | 3/2005 |
| WO | 2005/049522 A1 | 6/2005 |
| WO | WO 2005/049522 A1 | 6/2005 |
| WO | WO 2007/053398 A1 | 5/2007 |
| WO | WO 2007/096686 A1 | 8/2007 |
| WO | 2008/012438 A2 | 1/2008 |
| WO | WO 2008/012438 A2 | 1/2008 |
| WO | WO 2008/017414 A1 | 2/2008 |
| WO | 2010/085537 A2 | 7/2010 |

OTHER PUBLICATIONS

International Search Report dated Sep. 1, 2010, in PCT/US2010/021605, 3 pages.
Bakharev, T., "Geopolymeric materials prepared using Class F fly ash and elevated temperature curing," Cement and Concrete Research, 2005, 35:1224-1232,.
Hardjito et al., "Factors influencing the compressive strength of fly ash-based geopolymer concrete," Civil Engineering Dimension, Sep. 2004, 6(2):88-93.
Lee et al., "Structural reorganization of class F fly ash in alkaline silicate solutions," Colloids and Surfaces A: Physicochem. Eng. Aspects, 2002, 211:49-66.
Boral Fly Ash. Boral. Retrieved Sep. 6, 2013 from http://www.boralna.com/flyash/faq.asp.
Composition of Cement. Retrieved Sep. 6, 2013 from http://www.engr.psu.edu/ce/courses/ce584/concrete/library/construction/curing/Composition%20of%20cement.htm.
Office Action received in Canadian Application No. 2,768,626 dated Jun. 16, 2017.
Office Action received in Indian Application No. 5957/CHENP/2011 dated Jun. 7, 2017.
Office Action received in Mexican Application No. MX/a/2011/007683 dated May 24, 2017.
"Boral Fly Ash" to Boral (see manufacturing company http://www.boraln.com/flyash/faq.asp).

* cited by examiner

*Primary Examiner* — Anthony J Green
(74) *Attorney, Agent, or Firm* — Ajay A. Jagtiani; Miles & Stockbridge P.C.

(57) ABSTRACT

A geopolymer composite binder is provided herein, the composite binder including (i) at least one fly ash material having less than or equal to 15 wt % of calcium oxide; (ii) at least one gelation enhancer; and (iii) at least one hardening enhancer having a different composition from a composition of the at least one fly ash material.

27 Claims, 3 Drawing Sheets

TAILORED GEOPOLYMER COMPOSITE BINDERS FOR CEMENT AND CONCRETE APPLICATIONS

RELATED PATENT APPLICATION

This application is a Divisional of U.S. application Ser. No. 13/138,223, now abandoned which is the U.S. National Stage of PCT/US2010/021605, filed Jan. 21, 2010, which claims priority to U.S. Provisional Application Ser. No. 61/146,494, filed Jan. 22, 2009, which is herein incorporated by reference in its entirety.

BACKGROUND

The present invention relates to geopolymer composite binders for cement and concrete and methods of making and using thereof.

Geopolymers comprise of silicon and aluminum atoms bonded via oxygen atoms into a polymer network. Geopolymers are prepared by dissolution and poly-condensation reactions between a reactive aluminosilicate material and an alkaline silicate solution, such as a mixture of an alkali metal silicate and metal hydroxide. Examples of a reactive aluminosilicate material are Class F fly ash (FFA) and Class C fly ash (CFA).

Fly ash is a fine powder byproduct formed from the combustion of coal. Electric power plant utility furnaces burning pulverized coal produce most of the commercially available fly ashes. These fly ashes comprise mainly of glassy spherical particles, as well as hematite and magnetite, unburned carbon, and some crystalline phases formed during cooling. The structure, composition and properties of fly ash particles depend upon the composition of the coal and the combustion process by which fly ash is formed. American Society for Testing and Materials (ASTM) C618 standard recognizes two major classes of fly ashes for use in concrete: Class C and Class F. All ASTM standards and their specifications described in this disclosure are incorporated by reference in their entirety. Class F fly ash is normally produced from burning anthracite or bituminous coal, whereas Class C fly ash is normally produced from lignite or sub-bituminous coal. The ASTM C618 standard differentiates Class F and Class C fly ashes primarily according to their pozzolanic properties. Accordingly, in the ASTM C618 standard, one major specification difference between the Class F fly ash and Class C fly ash is the lower limit of ($SiO_2+Al_2O_3+Fe_2O_3$) in the composition. The lower limit of ($SiO_2+Al_2O_3Fe_2O_3$) for Class F fly ash is 70% and that for Class C fly ash it is 50%. Accordingly, Class F fly ashes generally have a calcium oxide content of about 15 wt % or less, whereas Class C fly ashes generally have a higher calcium oxide content (e.g., higher than 15 wt %, such as 20 to 40 wt %). A high calcium oxide content makes Class C fly ashes possess cementitious properties leading to the formation of calcium silicate and calcium aluminate hydrates when mixed with water.

Depending on the chemical composition and method of production, ground granulated blast furnace slag (GGBFS) is a glassy granular material that varies, from a coarse, popcorn-like friable structure greater than 4.75 mm in diameter to dense, sand-size grains. Grinding reduces the particle size to cement fineness, allowing its use as a supplementary cementitious material in Portland cement-based concrete. Typical ground granulated blast furnace slag includes 27-38% $SiO_2$, 7-12% $Al_2O_3$, 34-43% CaO, 7-15% MgO, 0.2-1.6% $Fe_2O_3$, 0.15-0.76% MnO and 1.0-1.9% by weight.

Since GGBFS is almost 100% glassy (or "amorphous"), it is generally more reactive than most fly ashes. GGBFS produces a higher proportion of the strength-enhancing calcium silicate hydrate (CSH) than Portland cement, thereby resulting in higher ultimate strength than concrete made with Portland cement.

In contrast to the concrete formed from Ordinary Portland Cement (OPC), a geopolymer concrete can exhibit greater heat-, fire- and acid-resistance. The process of forming geopolymers involves a dissolution/condensation/poly-condensation/polymerization reaction, which begins as soon as certain aluminosilicate materials are exposed to an alkaline solution.

One challenge is that Low Ca Class F fly ash based geopolymer concrete hardens very slowly and has a low final strength, particularly if cured at low temperatures (e.g., room temperature). This finding is consistent with observations in the literature. On the other hand, an increase in the Ca content can decrease the setting time, which can sometimes result in cracks in the products.

In addition, the setting time for a Class F fly ash based geopolymer decreases with increasing CaO content. For example, a Class F fly ash with about 12 wt % CaO sets in less than 40 minutes. As a consequence, micro-cracking occurs due to shrinkage, resulting in a low strength when samples are cured at room temperature.

Thus, a need exists to overcome these challenges to have a geopolymer that can maintain its final strength even when it is cured at a low temperature and at the same time has a sufficiently long setting time to mitigate micro-cracking.

SUMMARY

One embodiment of the invention provides a geopolymer composite binder including (i) at least one fly ash material having less than or equal to 15 wt % of calcium oxide; (ii) at least one gelation enhancer; and (iii) at least one hardening enhancer having a different composition from a composition of the at least one fly ash material.

Another embodiment provides a concrete or mortar geopolymer composition which has a seven day compressive strength of at least about 10000 psi, a setting time of 30 minutes to 3 hours or longer, if so desired, and a setting temperature between 20 and 75° C.

Another embodiment provides a method of making a concrete or mortar composition, comprising mixing (i) at least one fly ash material comprising less than or equal 15 wt % of calcium oxide; (ii) at least one gelation enhancer; (iii) at least one hardening enhancer, (iv) at least one activator and (v) at least one aggregate to form the composition.

DETAILED DESCRIPTION

One embodiment described herein provides tailored geopolymer composite (TGC) binders that can be used in cement, mortar, and/or concrete. A TGC hinder dry mix can include: i) a fly ash, such as Class F fly ash; ii) at least one gelation enhancer, such as metakaolin, certain dehydrated clays, dehydrated zeolites, nano or micro silica (including silica fume, colloidal silica, etc.) or alumina; and iii) at least one hardening enhancer, such as ground granulated blast furnace slag, High Ca Class F fly ash, or Class C fly ash. In some embodiments using a Low Ca Class F fly ash as the fly ash component of the dry mix, High Ca Class F fly ash may be used as a hardening enhancer. An optional setting modifier, such as boric acid, may be added depending on how much hardening enhancer will be used and on what gelation enhancer will be used. The proportions can depend on the curing temperature and the desired product properties. The dry mix is combined with an alkaline activation solution to form the binder.

Three kinetic processes can proceed sequentially during geopolymerization of the fly ash solid in an alkaline solution: Stage 1, dissolution; Stage 2, diffusion through a porous layer; and Stage 3, diffusion through a dense layer. Maximum concentrations of dissolved silica and alumina in the alkaline solution can be attained toward the end of Stage 2. Massive precipitation of alkali aluminosilicate gel (AAS) can occur when geopolymerization enters Stage 3. The present inventors find that the massive gel formation can coincide with the presence of a higher rate of strength gain during Stage 3. As a result, high mechanical (i.e., compressive) strength of a geopolymer product can be achieved by tuning the formulations or curing (or "setting") conditions to make Stages 2 and 3 occur earlier.

This can be accomplished by introducing additional dissolved silica and alumina into the alkaline solution and/or by curing at an elevated temperature. One direct effect includes shortening the hardening time and improving final strength of the geopolymer product. The compressive strength of geopolymer products can depend on both the reactivity and relative mass of the gel formed. In prior art methods, an alkali silicate solution is used to provide additional dissolved silica. "Reactivity" is herein defined as the relative mass of fly ash reacted with an alkaline solution, including the dissolved solid and the gel and/or newly formed crystalline phases. The present inventors find that the reactivity, which determines the rate of strength development and the final strength, depends strongly on curing temperatures if an appropriate solid to solution ratio is used. According to the present inventors' measurement, the activation energy of hydration can be as high as about 100 kJ/mol for Class F fly ash-based geopolymer in the temperature range of 20 to 75° C. In comparison, activation energies of hydration of Portland cements range from 20 to 50 kJ/mol. Therefore, the effect of temperature on curing of geopolymer pastes is much more pronounced.

The dissolved silica and/or alumina can come from various sources. For example, in one embodiment, a group of aluminosilicate materials can be used as additional sources for dissolved silica and/or alumina for Low Ca Class F fly-ash-based geopolymers. The aluminosilicate material can be crystalline or amorphous. The additive should desirably dissolve in an alkaline solution at a faster rate than the fly ash solid. This group of materials is herein referred to as "gelation enhancer," which will be described in more detail below. Some examples of this group of materials are metakaolin, certain dehydrated or partially dehydrated alkali-rich zeolitic phases, silica fume, volcanic ash, tuff, diatomaceous earth, dehydrated clays, colloidal alumina and silica, micro-silica, and certain ground waste glasses (container and flat glass). In one embodiment, the addition of these gelation enhancers does not substantially affect the reactivity of the fly ash solid, while it increases the quantity of alkali aluminosilicate gel formed in Stage 3, which results in a substantial improvement of compressive strength.

Unlike silica and alumina, which can dissolve in an alkaline solution first and then precipitate as gel, alkali-earth oxides and iron oxide in the glass phase of fly ash can dissolve as well, but quickly precipitate due to low solubility of the reaction products. Alkali aluminosilicate gel coexists with the calcium silicate hydrate (CSH) and/or related gels and/or crystalline calcium aluminosilicate phases in the tailored geopolymer composite products containing High Ca Class F fly ash, Class C fly ash or blast furnace slag. The present inventors find that the presence of abundant CSH and/or related gels and/or calcium aluminosilicate hydrate (CASH) phases can help achieve a higher rate of strength gain as well as a higher final strength of the product. These materials are referred to as "hardening enhancers," and will be described in more detail below. In addition to High Ca Class F fly ash, Class C fly ash, and blast furnace slag, other calcium-rich pozzolanic materials such as calcium silicates, calcium aluminates, which are main ingredients in Portland cement (e.g., $C_2S$, $C_3S$, $C_3A$), calcium hydroxide or hydrated lime, reactive magnesium oxide or magnesium hydroxide, gypsum or related compounds or flue gas desulfurization (FGD) gypsum, kiln dust, vitreous calcium aluminosilicate, are also considered to be good hardening enhancers.

Adding a hardening enhancer to the tailored geopolymer composite composition can affect the setting and hardening behavior of the geopolymer paste significantly. The setting process may be too short for proper handling of the geopolymer paste (short working time). A setting modifier may be needed to achieve an appropriate working time without affecting the performance of final products for cement and concrete applications. Setting modifiers can include, but are not limited to, boric acid, nitrate salts, phosphoric acid or related compounds, or combinations thereof.

Fly Ash

One ingredient of a TGC binder is a fly ash material. The fly ash material can be any suitable fly ash material that can provide the desirable properties described herein. In one embodiment, the fly ash can be a fly ash which comprises less than or equal to about 15 wt % of calcium oxide. One example of such fly ash is Class F fly ash. The classification of fly ash is based on ASTM C618, which is generally understood in the art. One embodiment of the TGC described herein comprises Class F fly ash in the amount of, at least about 15 wt %, such as at least about 40 wt %, such as at least about 60 wt % of the dry mixture of a TGC binder, for example 15 to 90 wt % of the dry mixture, such as 50 to 80 wt %. In one embodiment, the dry mixture contains a maximum of about 90 wt % Class F fly ash. The term "about" describing the wt % herein refers to a small amount of deviation, such as less (or greater, in the case of "+") than or equal to ±5 wt %, such as less (or greater) than or equal to ±2 wt %, such as less (or greater) than or equal to ±1 wt %, such as less (or greater) than or equal to ±0.5 wt %, such as less (or greater) than or equal to ±0.1 wt %. This definition is also applicable to descriptions of other quantities.

A portion of the fly ash can be an amorphous aluminosilicate phase (i.e., glassy material), which can be reactive in strongly alkaline solutions. The magnitude of the portion can vary, depending on the suitable application. For example, it can be about 50% or more, 60% or more, 70% or more, 80% or more, 90% or more, such as 50-95%. The reactivity of Class F fly ash can depend on the amount of the amorphous phase contained therein and on the particle size of the fly ash solid. The kinetics of reactions during dissolution and geopolymerization of fly ash in an alkaline solution can be modeled using the Jander Equation, in which the rate of reaction is determined by the particle size and a rate constant. In one embodiment, the fly ash should contain at least 65 wt % amorphous aluminosilicate phase and have a particle diameter of 60 μm or less, such as 50 μm or less, such as 45 μm or less, such as 30 μm or less. In one embodiment, the use of Class F fly ash with up to 12 wt % of Loss On Ignition (LOI) in the TGC binder does not substantially affect the performance of respective cement and concrete products.

Most Class F fly ashes have a CaO (and, thus, Ca) content of less than 8 wt %, while some contain 8 to 15 wt % CaO. However, the properties of a fly ash-based binder can depend significantly on the fly ash's CaO oxide content. Therefore, Class F fly ash can be further separated into "Low Ca Class F fly ash" and "High Ca Class F fly ash" based on its calcium content. In other words, when the fly ash is a High Ca Class F fly ash, the CaO within the fly ash is greater than 8 wt % but less than or equal to about 15 wt %, for example 10 to 12 wt %. Alternatively, when the fly ash is a Low Ca Class F fly ash, the CaO is less than or equal to about 8 wt %, such as 1 to 8 wt % CaO, for example 1.5 to 6 wt % CaO. For example, when used in a binary system (e.g., a two component binder), a low Ca content in a fly ash can demand significantly different amounts of the second binder component than a fly ash with a high Ca content to obtain the same workability, setting time, curing time and temperature of a geopolymer paste, and comparable strength of the final product. Nevertheless, this dependency on Ca content can be drastically minimized in the presently described ternary (three-component binders, as in Tables 4 and 6) or quaternary system (four-component binder in, as in Table 5). As seen in Table 5, the effect of the Ca concentration in the fly ash almost vanishes. Hence, the compositions and properties of TGC-based cements are minimally affected by the use of Low or High Ca Class F fly ashes. This opens the possibility of using hitherto less desirable fly ash compositions. While Class F fly ash has been described as a preferred fly ash component of the dry mix, other ashes, such as low lime content volcanic ash may be used instead in some embodiments.

Gelation Enhancer

Another ingredient in the TGC binder mixture described herein is the gelation enhancer, which is less than 80 wt %, such as less than 50 wt %, such as less than 25% wt % of the binder dry mixture. In one embodiment, the gelation enhancer is at least about 5 wt % of the dry mixture of a TGC binder, for example 5 to 80 wt %, such as 10 to 25 wt % of the dry mixture. The gelation enhancer can be any of the following: metakaolin, micron or nano sized range silica, such as silica fume, and other natural or synthetic pozzolanic materials that show a high dissolution rate in alkaline solution, or combinations thereof. Examples of other gelation enhancers include diatomaceous earth, micro-silica, which is a highly reactive pozzolan processed from siliceous material from a natural deposit, colloidal alumina and silica, sodium aluminate, any form of aluminum hydroxide, certain natural pozzolanic minerals, such as analcime [$NaAlSi_2O_6 \cdot H_2O$], natrolite [$Na_2Al_2Si_3O_{10} \cdot 2H_2O$], clinoptilolite [$(Na,K,Ca)_{2-3}Al_3(Al,Si)_2Si1_3O_{36} \cdot 12H_2O$], dehydrated clay minerals, volcanic ash, tuff, and ground glass waste powders (e.g., container and flat glasses, which are generally soda-lime silicate glasses). These natural or synthetic pozzolanic materials can be very reactive in alkaline solutions and thus can be desirable gelation enhancers for TGC binders.

A gelation enhancer can also comprise clay minerals, such as montmorillonite, which has a general formula of $Na_{0.2}Ca_{0.1}Al_2Si_4O_{10}(OH)_2 \cdot nH_2O$ (n is an integer). Montmorillonite, a member of the smectite family, is a 2:1 clay, with 2 tetrahedral sheets sandwiching a central octahedral sheet. The particles are plate-shaped with an average diameter of approximately 1 p.m. It is the main constituent of the volcanic ash weathering product, bentonite, and is readily available. Montmorillonite shows excellent pozzolanic activity after it is calcined at temperatures from about 600 to 900° C. A typical dehydrated montmorillonite contains 1.75% $Na_2O$, 1.58% CaO, 28.80% $Al_2O_3$, and 67.87% $SiO_2$ by weight. Other material, such as calcined bentonite may also be used.

The TGC binder dry mixture can be mixed with an alkaline solution to form a binder paste. One preferred gelation enhancer is metakaolin. The rates of metakaolin dissolution and polymerization in an alkaline solution can be very high (i.e., from minutes to hours), and the water expelled during geopolymerization can help improve the workability of the TGC paste and enhance the hydration process of a hardening enhancer.

The present inventors have discovered that metakaolin can increase or decrease the setting time of the final composition depending on the CaO content of the fly ash component of the TGC binder. Thus, metakaolin beneficially increases the usually short setting time of High Ca Class F fly ash containing TGC binders. In contrast, metakaolin also beneficially decreases the usually long setting time of Low Ca Class F fly ash containing TGC binders. In general, by including metakaolin, the setting time of the final concrete or mortar composition can be set to the desired 30 minutes to 3 hours or longer, such as 1 hour to 3 hours, such as 90 to 120 minutes.

Hardening Enhancer

A third ingredient in the TGC binder dry mixture can be the hardening enhancer, which can be less than about 80 wt %, such as less than about 50 wt %, such as less than about 25 wt %, of the dry TGC binder mixture. In one embodiment, the hardening enhancer can be at least about 5 wt % of the dry mixture of a TGC binder, for example 5 to 80 wt %, such as 10 to 25 wt % of the dry mixture. A hardening enhancer can be any of the following (or combinations thereof): ground granulated blast furnace slag, High Ca Class F fly ash, Class C fly ash, certain alkali-earth compounds (e.g., calcium hydroxide or hydrated lime, magnesium hydroxide, reactive magnesium oxide, or calcium chloride), aluminum hydroxide, gypsum or related compounds or FGD gypsum, gypsum containing waste products such as bottom ash, and certain calcium-rich pozzolanic or zeolite materials. Blast furnace slag, High Ca Class F fly ash and Class C fly ash are desirable as hardening enhancers. These hardening enhancers can produce substantial gains in product strength and help control the rate of reaction. High Ca Class F fly ash, Class C fly ash and ground granulated blast furnace slag can be much more reactive than Low Ca Class F fly ash—they dissolve more readily in alkaline solutions. The greater reactivity of these components produces a higher concentration of ions, such as silicate, aluminate, calcium hydroxide, which in turn react to produce a denser network of polymeric chains (alkali or alkali-earth aluminosilicate) and/or cementitious CSH and/or related gel/CASH phases, and, as a result, greater strength. The greater reactivity of the hardening enhancers can also help even out variations in the reactivity of the Low Ca Class F fly ash. Ground granulated blast furnace slag covered by ASTM C 989-82 should be used in TGC concrete and mortar with grades of at least 80.

Examples of calcium-rich pozzolanic materials are calcium silicate and calcium aluminate phases (e.g., $C_2S$, $C_3S$, $C_3A$), calcium sulfate, belite, wollastonite and certain calcium-rich pozzolanic materials and certain calcium-rich zeolite phases. When these phases are applied as the hardening enhancer, additional CSH or CASH gel forms together with alkali-aluminosilicate gel in a TGC mortar or concrete system.

Examples of calcium-rich pozzolanic materials are kiln dust, bottom ash, and vitreous calcium aluminosilicate (VCAS). VCAS is a waste product of fiberglass production. In a representative glass fiber manufacturing facility, typically about 10-20 wt % of the processed glass material is not converted to final product and is rejected as a by-product or waste and sent for disposal to a landfill. VCAS is 100% amorphous and its composition is very consistent, mainly including 50-55 wt % $SiO_2$, 15-20 wt % $Al_2O_3$, and 20-25 wt % CaO. Ground VCAS exhibit pozzolanic activity comparable to silica fume and metakaolin when tested in accordance with ASTM C618 and C1240. Therefore, it can be a very efficient hardening enhancer by forming additional cementitious compounds such as CSH and CASH gels.

Cement Kiln Dust (CKD) is a by-product of the manufacture of Portland cement, therefore an industrial waste. Over 30 million tons of CKD are produced worldwide annually. Significant amounts of CKD are currently put into land fills. Typical CKD contains 38-64 wt % CaO, 9-16 wt % $SiO_2$, 2.6-6.0 wt % $Al_2O_3$, 1.0-4.0 wt % $Fe_2O_3$, 0.0-3.2 wt % MgO, 2.4-13 wt % $K_2O$, 0.0-2.0 wt % $Na_2O$. 1.6-18 wt % $SO_3$, 0.0-5.3 wt % $Cl^-$, and 5.0-25 wt % LOI. CKD is generally a very fine powder (4600-14000 $cm^2/g$ specific surface area) and is a good hardening enhancer. When CKD is used in a TGC formulation, elevated concentrations of the alkali oxides contained in it enhance geopolymerization. Additional formation of CSH gel, ettringite ($3CaO.Al_2O_3.3CaSO_4.32H_2O$), and/or syngenite (a mixed alkali-calcium sulfate) can help develop early strength of a TGC mortar or concrete.

As noted above, certain calcium-rich zeolite phases may also be used. The zeolite materials with or without dehydration (partial or complete) are very reactive in an alkaline solution. During the alkaline dissolution, calcium, aluminum and silicon are released. Thus, additional CSH and/or related gel and/or alkali and/or calcium aluminosilicate gel form. Zeolite crystallization can generally be suppressed at ambient temperatures (e.g., below 45° C.). Important calcium-rich zeolite phases include chabazite [$(Ca,Na_2,K_2,Mg)Al_2Si_4O_{12}.6H_2O$], Calcium rich clinoptilolite, heulandite [$(Ca,Na)_{2-3}Al_3(Al,Si)_2Si_{13}O_{36}.12H_2O$], phillipsite [$(Ca,Na_2,K_2)_3Al_6Si_{10}O_{32}.12H_2O$], and stilbite [$NaCa_2Al_5Si_{13}O_{36}.14H_2O$]. These zeolite phases are abundant in nature with molar $SiO_2/Al_2O_3$ ratios from 2 to 7, which are within the favorable range of formation of geopolymer compositions. Clinoptilolite is a commercially available natural pozzolanic material used in manufacturing environmental filters and high performance concrete.

Alternatively, $Ca(OH)_2$, together with silica fume or dissolved silica, can be applied as the hardening enhancer in a TGC binder formulation. In one embodiment wherein the TGC is in a mortar or concrete, CSH gel can form in addition to alkali and/or calcium aluminosilicate gel in a TGC mortar or concrete. If $Ca(OH)_2$ and aluminum hydroxide or dissolved aluminate are used as hardening enhancers, additional CAH gel or related phases can form. If gypsum or FDG gypsum or bottom ash together with aluminum hydroxide or certain reactive aluminum rich pozzolans are applied as hardening enhancers, additional ettringite can form as a primary phase. These calcium rich pozzolans can help the TGC-containing mortar or concrete achieve high early strength and the coexistent alkali- and/or alkali-earth aluminosilcate gel help improve both early and final strength.

Setting Modifier

A fourth ingredient in the TGC binder dry mixture can be the setting modifier, which is added with up to about 5 wt %, such as 0-5 wt %, for example 1 to 3 wt %, of the dry mixture for the TGC binder to control setting rate. Depending on the application, setting modifier may be optional. Setting modifiers can include, but are not limited to setting retardants, such as boric acid or borax, and setting enhancers, such as nitrate salts, phosphoric acid, sodium sulfate, sodium phosphate, calcium chloride, sodium citrate, or related compounds, or combinations thereof. The present inventors have found that sodium phosphate and sodium citrate, which are setting retardants in Portland cement may function as setting enhancers in the TGC binder containing compositions.

The four ingredients described herein can constitute the dry mixture of a TGC binder, totaling 100 wt %.

Activator

In addition to the dry mixture, an alkaline activation solution ("activator") is added to form a TGC binder. The activator is in effect a solution of metal hydroxide and metal silicate. In one embodiment, the metal hydroxide used in the process can be an alkali metal hydroxide. The metal in the metal hydroxide can preferably be an alkali metal, particularly sodium.

The metal silicate can be an alkali metal silicate and/or alkaline earth metal silicate. Alkali metal silicates, particularly sodium silicate, are desirable. Sodium silicate with a mass ratio of $SiO_2/Na_2O$ equal to about 2 to 3.2 is preferred. The sodium silicate solution preferably comprises about 38 to 55 wt % alkali silicate solids and about 45% to 62 wt % water.

An activation solution can be prepared by diluting the commercially available sodium silicate solution with water and adding solid sodium hydroxide to adjust the solution with target concentrations of $Na_2O$ and $SiO_2$ for the correct mixture of a TGC binder and aggregate in a mortar or concrete application. Alternately, fumed silica, can also be used to make the activation solution by dissolving it in an alkali hydroxide solution.

In one embodiment, the dry mixture, with the ingredients described above, and the alkaline activation solution can constitute the important components for a TGC binder. In one embodiment, the dry mixture of the TGC binder can consist essentially of at least one fly ash material, at least one gelation enhancer and at least one hardening enhancer. Depending on the application, optionally, two or more hardening enhancers can be used and/or a setting modifier can be added. In other words, the TGC binder can consist essentially of the dry mixture and the activator. The dry TGC binder components can be premixed either off-site or on site and then mixed with an activation solution. The TGC binder and activation solution can be further mixed with aggregates on site for a mortar, cement, and/or concrete application. In a ready-mix application, a TGC binder dry mixture and an alkaline activation solution are prepared separately in a regional facility and then shipped to the application site.

The TGC mortar mixture can be prepared by mixing TGC binder components with fine aggregate. The fine aggregate is understood to have a particle size range of about 0.1 mm to 10 mm, such as about 0.25 to about 4 mm, and a particle size variation within the range conforming to ASTM C-33. The TGC mortar mixtures may be prepared with about 30 wt % to 70 wt % fine aggregate in the resultant mixture, such as about 40 to 60 wt % fine aggregate.

The TGC concrete mixture can be prepared with about 10 to 75 wt. %, such as 30 to 55 wt %, coarse aggregate and about 10 to 80 wt %, such as about 20 to 65 wt %, fine aggregate in the mixture. The aggregate components can be the first addition to the TGC mortar or concrete mix and they can be used in an as-received moisture condition. Under normal condition, the coarse aggregate can have moisture content in the range of about 0.5 to 2.5%, whereas the fine aggregate may have about 2 to 7%. The water present in the aggregates should be taken into account in the formulation process.

Constraining Parameters

Constraining parameters and their respective ranges can be used to define certain non-limiting formulations of TGC binders for mortar and concrete applications. The constraining parameters are set for the specific ingredients used in the TGC binders.

The constraining parameters for metakaolin as a gelation enhancer include a set of molar ratios of $SiO_2/Al_2O_3$, $M_2O/Al_2O_3$, and $H_2O/M_2O$, where M represents alkali metals (Na, K, Li) or alkali-earth metals. The molar $SiO_2/Al_2O_3$ ratio in metakaolin is about 2. Alkali hydroxide and alkali silicate are added to the solution to obtain the required values for the molar ratios characteristic of an activation solution. For a metakaolin containing TGC binder, the $SiO_2/Al_2O_3$ molar ratio ranges from about 2.5 to 6.0, such as 3.0 to 4.0; $M_2O/Al_2O_3$ ranges from about 0.7 to 1.5, such as from 0.9 to 1.25; and $H_2O/M_2O$ ranges from about 5 to 18, such as from about 8 to 13.

The constraining parameters for Class F fly ash (as a main ingredient), Class C fly ash, VCAS, or blast furnace slag (as a hardening enhancer) include a set of mass fractions of $M_2O$, $SiO_2$, $H_2O$ and molar ratio $SiO_2/M_2O$ that are used to formulate an activation solution. Mass fractions of $M_2O$ or $SiO_2$ of the pozzolanic materials, either as a main ingredient or a hardening enhancer can range from about 0.01 to 0.15, such as about 0.05 to 0.09. The molar $SiO_2/M_2O$ ranges from about 0.2 to 2.5, such as about 0.8 to 1.5. The mass fraction of $H_2O$ of the main ingredient or a hardening enhancer can range from about 0.20 to 0.60, such as from about 0.25 to 0.35. Alkali metals can be Na, K, or Li, and Na in particular can be used to save cost. The amounts of alkali hydroxide, alkali silicate, and water needed for each dry TGC binder component are summed up to formulate a TGC activation solution composition. Since the zeolitic composition supplies not only abundant $SiO_2$ and $Al_2O_3$, but also alkali oxides for the formation of zeolitic alkali aluminosilicate gel during geopolymerization, additional alkali hydroxide and alkali silicate may not be needed.

In one embodiment, montmorillonite has a molar ratio of $SiO_2/Al_2O_3$ of about 4, which is a typical value for poly (siliate-siloxo). In addition, it contains small amounts of alkali- and alkali-earth oxides. Therefore, the respective ranges of constraining parameters (molar ratios of $SiO_2/Al_2O_3$, $M_2O/Al_2O_3$, and $H_2O/M_2O$) for dehydrated montmorillonite as a gelation enhancer will deviate from those of metakaolin. Generally, smaller amounts of alkali hydroxide and alkali silicate are needed to formulate an activation solution. For montmorillonite, the molar $SiO_2/Al_2O_3$ ratio must be in the range from about 2 to 12, such as 4 to 10, such as 4 to 6; $M_2O/Al_2O_3$ in the range from about 0.7 to 1.5, such as from 0.9 to 1.25; and $H_2O/M_2O$ ranges from about 5 to 20, preferably from about 9 to 16. This is effected by using respective amounts of $SiO_2$, NaOH, and water to prepare the activation solution. The alkali- and alkali-earth oxides present in the dehydrated montmorillonite should be included to calculate molar $M_2O/SiO_2$ and $H_2O/M_2O$ for an alkaline activation solution. One mole of alkali-earth (e.g., Ca) is equivalent to two moles of alkali element. It is generally recognized that calcium in a smaller quantity participates in geopolymerization to form calcium aluminosilicate gel as a result of poly-condensation and polymerization instead of CSH gel.

Constraining parameters for fumed silica, micro-silica, alumina, any form of aluminum hydroxide, and diatomaceous earth as a gelation enhancer can include the mass fraction of $M_2O$ and $H_2O$ used to formulate an alkaline solution. Mass fraction of $M_2O$ ranges from about 0.01 to 0.15, such as about 0.05 to 0.09 and the mass fraction of $H_2O$ ranges from about 0.1 to 0.80, such as from about 0.20 to 0.60.

Constraining parameters applied to formulate an alkali activator solution for alkali-earth compounds as hardening enhancers can depend on what the desirable gel composition is intended to induce in a TGC product. For example, if calcium hydroxide, or hydrated lime or calcium chloride is applied as a hardening enhancer, the mass fractions of $SiO_2$ (either dissolved silica or silica fume or equivalent material) ranging from about 0.1 to 0.75 can be used to induce CSH gel. Alternatively, if a desired gel composition is CASH, the mass fractions of alumina or aluminum hydroxides ranges from 0.1 to 1.0 can be used, and the mass fractions of $SiO_2$ range from 0.1 to 0.75. In another embodiment, when gypsum or FDG gypsum is applied as a hardening enhancer and a desired gel composition is ettringite, then the mass fractions of dissolved aluminate and/or alumina or aluminum hydroxides will be in the range of 0.2 to 1.5.

Constraining parameters for kiln dust as a hardening enhancer include the mass fractions of $SiO_2$ (dissolved silica or any sources of amorphous silica materials—e.g., micro-silica, fumed silica), $Al_2O_3$ (dissolved aluminate, alumina, or aluminum hydroxides), and $H_2O$. Kiln dust is rich in free lime and gypsum, showing strong hydraulic pozzolanic property. The Mass fractions of $SiO_2$ range from 0.05 to 0.75, such as 0.25 to 0.5. The mass fraction of $Al_2O_3$ ranges from 0.00 to 1.0, and the mass fractions of water range from 0.15 to 0.6, preferably from 0.25 to 0.35. The resulting gel compositions will include CSH, ettringite, and CASH.

Constraining parameters for calcium silicates or calcium aluminates may not be needed except for water. The mass fractions of $H_2O$ range from 0.2 to 0.5, such as from 0.25 to 0.35.

Cement/Mortar/Concrete Applications

Provided herein is a general approach to obtain an applicable formulation for a TGC mortar or concrete (or for a TGC cement that is used in the mortar or concrete). In one embodiment, a dry binder composition can comprise the four ingredients, which are described previously and totaling 100 wt %. The composition of an activation solution is formulated based on a set of constraining parameters and their respective ranges for each dry TGC binder component (e.g., a main Class F fly ash, at least one gelation enhancer and at least one hardening enhancer) by summing up the needed amounts of alkali hydroxide, dissolved silica, and/or dissolved alumina, and water. When the weight percent of aggregate is determined in a TGC mortar or concrete mix, the compositions of the dry binder and the activation solution are then normalized so that the total of the dry binder, the activation solution and the aggregate amounts to 100 wt %.

The manipulation of the constraining parameters can allow optimization of the TGC binder compositions for mortar and concrete applications to achieve rapid strength growth and a high final strength. TGC binders described herein for mortar and concrete can be applied at ambient temperatures as well as those specifically formulated for any other forms commonly applied in construction industry, such as pre-cast applications, which usually require curing at elevated temperatures to achieve high production rates. One advantage of the TGC binder described herein is that, in addition to the high compressive strength of the final product, the curing temperature of the cement, mortar, or concrete application can be lowered from the conventional approach. For example, curing can be carried out at less than or equal to about 250° C., such as less than or equal to about 100° C., such as less than or equal to about 75° C., such as less than or equal to about 50° C., such as less than or equal to about 45° C., such as less than or equal to about 30° C., such as less than or equal to about 25° C., such as less than or equal to about 20° C. For example, the setting temperature may be 20 to 250° C., such as 25 to 40° C., and the setting time may be 30 minutes to 3 hours, such as 1 to 3 hours, for example such as 90 to 120 minutes. The composition is workable during the setting time. After the composition is set, it is cured for at least 24 hours, such as 24 hours to one week or longer at a curing temperature between 20 and 75° C.

In a mortar or concrete application, the main ingredient Class F fly ash ranges from 15 to 90 wt %, such as from about 50 to 80 wt %, of the dry TGC binder. In one embodiment, a preferred gelation enhancer is metakaolin with up to 85 wt %, a preferred range of about 10 to 25 wt % of the dry binder. A preferred hardening enhancer can be High Ca Class F fly ash, Class C fly ash and ground granulated blast furnace slag. Their respective preferred range is about 10 to 25 wt % of the dry binder. The addition of a setting modifier can depend on percentage of the hardening enhancers in a particular formulation of the TGC binder composition. Generally, a setting modifier is not required when the hardening enhancer is less than 15 wt % of the dry binder and when the gelation enhancer metakaolin is applied in a TGC mortar or concrete mixture with High Ca Class F or Class C fly ash. In TGC formulations for high early strength mortar and concrete, hardening enhancers can generally be more than 20 wt % of the dry TGC binder composition, and therefore, a setting modifier may be needed to obtain an appropriate working time.

For an activation solution, the preferred metal silicate is sodium silicate and the preferred alkali hydroxide is sodium hydroxide. The characteristics of an activation solution include the water to TGC solid ratio; activator to TGC solid ratio; alkali oxide to TGC solid ratio; silica to TGC solid ratio; and silica to alkali oxide ratio, all by weight. The preferred ranges in these characteristic ratios are determined by constraining parameters and their respective ranges set for each of the dry TGC binder components. The TGC solids include all dry TGC binder components and the solids present in the activation solution in the form of alkali- and alkaline-earth oxides (e.g., $Na_2O$, $CaO$) and silica ($SiO_2$). The water to TGC solid ratio is generally in the range of about 0.12 to 0.80, such as 0.15 to 0.60, and such as about 0.18 to 0.40. The $Na_2O$ to TGC solid ratios by weight are generally in the ranges of about 0.01 to 0.25 and preferably 0.02 to 0.15, such as about 0.05 to 0.10; and the $SiO_2$ to TGC solid ratios are generally in the ranges of about 0.01 to 0.25, such as about 0.03 to 0.25 and preferably 0.02 to 0.20, such as 0.02 to 0.15. The $SiO_2$ to $Na_2O$ ratios by weight are generally in the range of about 0.1 to 2.0, such as 0.5 to 1.5, such as 0.75 to 1.25.

The activator to TGC solid ratios by weight are generally in the range of about 0.20 to 0.85, such as 0.25 to 0.75, such as about 0.30 to 0.45. The water to total solid ratio (the TGC solids plus aggregates) and the activator to total solid ratio by weight can vary depending on the aggregate and the TGC binder properties, as well as whether a water reducer is used. The water to total solid ratios will generally be in the range of about 0.04 to 0.35 and preferably about 0.10 to 0.25 for a mortar application and 0.05 to 0.10 for a concrete application. The activator to total solid ratios are generally in the range of about 0.05 to 0.60, such as about 0.15 to 0.35, for a mortar application and about 0.05 to 0.18, such as 0.07 to 0.15 for a concrete application.

In one embodiment, the calculated ranges of the TGC formulations for mortar and concrete applications can be:
Class F Fly ash: 2 to 50 wt %
Metakaolin or other gelation enhancer(s): 0.6 to 15 wt %
Blast furnace slag or other hardening enhancer(s): 0.6 to 17 wt %
$Na_2O$: 0.8 to 7.5 wt %
$SiO_2$: 0.6 to 15 wt %
Water: 4.0 to 25 wt %
Set modifier (e.g., boric acid) 0.0 to 3 wt %
Aggregate: 25 to 85 wt %

In one embodiment, $Na_2O$, $SiO_2$, and water are quantified proportionally to prepare an activation solution where sodium hydroxide and sodium silicate are used as sources for $Na_2O$ and $SiO_2$, respectively. The aggregate components include fine and/or coarse grades. Another embodiment comprises the following TGC cement and concrete masses by weight: 40 to 85%, such as 50% to 75% aggregate (coarse or/and fine grade); 5 to 30% Class F fly ash, 1.3 to 12% gelation enhancer, 1.5 to 13% hardening enhancer, 0.9 to 5% $Na_2O$; 1.0 to 9% $SiO_2$; and 5.5 to 18% water.

In another embodiment, wherein cost minimization is a goal, the composition comprises the following TGC cement and concrete masses by weight: 5-30 wt % Class F fly ash, 40-85% aggregate, 0.6 to 10 wt % gelation enhancer (e.g., metakaol in), 0.6 to 10 wt % hardening enhancer (e.g., GGBFS or Class C fly ash), 0.8 wt % to 5% $Na_2O$, 0.6 to 6 wt % $SiO_2$, and 4.5 to 15 wt % $H_2O$.

The resultant geopolymer composite binder can be used to form a composition of a concrete or mortar that has superior properties. Such a geopolymer binder or cement can reduce the temperature to set (or "cure") the composition at a temperature much lower than about 100° C., such as less than or equal to 75° C., such as less than or equal to 50° C., such as less than or equal to 25° C. The setting time can also be optimized (i.e., decreased for Low Ca Class F fly ash or increased for High Ca Class F fly ash containing TGC binders). For example, in one embodiment, the setting time can be 30 minutes to 3 hours, such as 1 hour to 3 hours, for example 90 to 120 minutes.

The compressive strength of the resultant composition can be very high. For example, in a ternary dry mixture system with a low Ca Class F fly ash embodiment (see Table 4), when the composition is cured at 25° C., the seven day compressive strength can be at least about 4500 psi (1 psi=6.895 KPa) and can be more than about 11500 psi, such as 4500 to 12500 psi. In another embodiment, wherein the composition is cured at 75° C., the seven day compressive strength can be at least about 5000 psi and can be on the order of 10000 psi or more than about 12000 psi, such as 5000 to 12500 psi. As will be described in more detail in the examples below, the high curing temperature does not significantly improve the strength of the ternary dry mix based geopolymer concrete compared to that of a simple fly ash based geopolymer concrete cured at the same temperature.

Alternatively, in a ternary dry mixture system with a high Ca Class F fly ash embodiment (see Table 6), when the composition is cured at 25° C., the seven day compressive strength can be at least 3700 psi (1 psi=6.895 KPa) and can be more than 10000 psi, such as 4500 psi to 10500 psi. In another embodiment, wherein the composition is cured at 75° C., the seven day compressive strength can be at least 4500 psi and can be more than 11000 psi, such as 4500 to 13500 psi. In yet another embodiment, the compressive strength can be more than 13000 psi, such as more than 14000 psi, such as more than 15000 psi. Such high compressive strength can be valuable when the composition is employed a railway related application, which can sometimes demand more than 14500 psi as the material's compressive strength. In general, the seven day compressive strength of the concrete or mortar may be at least 10000 psi, such as A concrete or mortar geopolymer composition which has a seven day compressive strength of at least about 10000 psi, such as 10000 psi to 14500 psi, a setting time of 30 minutes to 3 hours, a setting temperature between 20 and 75° C., a curing time of least 24 hours and a curing temperature between 20 and 75° C., such as a compressive strength of 10000 to 12530 psi at room temperature and a setting time of 1 to 3 hours and the same curing time and temperature as above.

Another advantage of producing a cement/concrete/mortar using the presently described binder is that there is lower release of carbon dioxide than in production of Portland cement and the geopolymer binder based cement and concrete can achieve higher early strength than normal Portland cement and concrete. Also, the product can be resistant to corrosion, such as that induced by salt, such as a sulfate, as well as heat, fire, and/or acid.

Calculated Composition Examples

Tables 1 to 3 provide calculated examples of TGC formulations for concrete applications. For a ready mix application, Class F fly ash (FFA), a gelation enhancer (e.g., metakaolin), and a hardening enhancer (e.g., blast furnace slag, BPS) are mixed and packed for shipment. In one embodiment, Class F fly ash, metakaolin, and blast furnace slag are mixed and packed for applications. In other embodiments, Class C fly ash (CFA) can be used instead of blast furnace slag. Both blast furnace slag and Class C fly ash act as hardening enhancers. The activation solution can be manufactured separately on site or off-site. As used herein, the term "site" refers to an area where the mortar or concrete is being used (e.g., an area of building or road construction site rather than a factory where the dry mix is made and packaged). If a commercially available sodium silicate solution is used with a mass ratio of $SiO_2$ to $Na_2O$=2.0, sodium hydroxide in the solid form and additional water are added to the solution to attain target contents described in Table 1. The mass ratio $SiO_2$ to $Na_2O$ is in the range of 1.0 to 1.5. Alternatively, silica fume can be dissolved in a sodium hydroxide solution to attain target contents of $Na_2O$ and $SiO_2$ to prepare the activation solution. Then the activation solution will be mixed with the dry binder components and aggregate (fine and coarse aggregates). Alternatively, the activation solution can be mixed with the aggregate first and then mixed with the dry TGC binder components. A setting modifier or/and a water reducer may be added together with other ingredients if required. A trial test with a TGC formulation composition can determine whether a setting modifier is needed to achieve an appropriate working time.

In another embodiment for a mortar or concrete application, the gelation enhancer is a partially dehydrated zeolite, e.g., clinoptilolite. Partially dehydrated clinoptilolite rehydrates at ambient temperatures but dissolves in a highly alkaline solution. Using clinoptilolite from Castle Creek, Idaho as an example, the zeolite contains about 76 wt % $SiO_2$, 15 wt % $Al_2O_3$, 6 wt % $Na_2O+K_2O$, and 2 wt % $CaO+MgO$ assuming it is completely dehydrated. To formulate a TGC binder composition, which employs the zeolitic material as a gelation enhancer, all constraining parameters and their ranges defined above apply except for the zeolitic material itself. Since the zeolite composition supplies not only abundant $SiO_2$ and $Al_2O_3$ but also alkali oxides for the formation of zeolitic gel during geopolymerization, additional alkali hydroxide and alkali silicate may not be required. In general, the zeolite has a preferred range of about 10 to 25 wt % of the dry TGC binder. The preferred hardening enhancer is either Class C fly ash or ground granulated blast furnace slag. Their preferred ranges are about 10 to 25 wt % of the dry binder, respectively. Table 2 lists some examples of TGC formulations for cement and concrete applications using zeolitic materials as gelation enhancers.

In another embodiment, dehydrated montmorillonite is used as a gelation enhancer. dehydrated montmorillonite may comprise about 5 to 50 wt %, preferably 10 to 25 wt. % of the dry TGC binder. The preferred hardening enhancer is either Class C fly ash or ground granulated blast furnace slag. Their preferred ranges are about 10 to 25 wt % of the dry binder, respectively. Table 3 lists some examples of TGC formulations for cement and concrete applications using dehydrated montmorillonite as a gelation enhancer.

In another embodiment, the compositions that employ dehydrated montmorillonite (D-Mont) as a gelation enhancer comprise the following ingredients in the amounts by weight:
Class F Fly ash: 5 to 45 wt %
Dehydrated montmorillonite: 1.5 to 18 wt %
Furnace slag or Class C fly ash: 1.5 to 18 wt %
$Na_2O$: 0.6 to 6 wt %
$SiO_2$: 0.3 to 8 wt %
Water: 4.5 to 22 wt %
Set modifier (boric acid) 0.0 to 3 wt %
Aggregate: 25 to 85 wt %.

In another embodiment wherein the composition employs dehydrated montmorillonite as a gelation enhancer includes 40 to 85% aggregate (coarse or/and fine grade); 6 to 35% Class F fly ash; 1.5 to 13% dehydrated montmorillonite; 1.5 to 14% furnace slag or Class C fly ash; 0.8 to 4.5% $Na_2O$; 0.3 to 6% $SiO_2$; and 5 to 17% water. The water to TGC solid ratio may be in a range of about 0.15 to 0.35. The $Na_2O$ to TGC solid ratios by weight may in the range of about 0.03 to 0.10, and the $SiO_2$ to TGC solid ratio may be in the range of about 0.02 to 0.13. The activator to TGC solid ratio by weight may be in the range of about 0.30 to 0.50. The water to total solid ratio (the TGC solids plus aggregates) and the activator to total solid ratio by weight will vary depending on the aggregate and the TGC binder properties as well as whether a water reducer is used or not. The water to total solid ratio may be in the range of about 0.05 to 0.25. The activator to total solid ratio may be in the range of about 0.07 to 0.45.

TABLE 1

Calculated weight percent examples of TGC formulations for mortar and concrete using metakaolin as a gelation enhancer

| | Dry Binder | | | Activation Solution | | | | |
|---|---|---|---|---|---|---|---|---|
| # | FFA | MK | BFS* | Na2O | SiO2 | H2O | Aggregate | Sum |
| 1 | 15.29 | 7.64 | 7.64 | 3.29 | 3.85 | 12.29 | 50.00 | 100.00 |
| 2 | 25.97 | 3.25 | 3.25 | 2.54 | 3.70 | 11.30 | 50.00 | 100.00 |
| 3 | 19.45 | 3.24 | 9.72 | 2.79 | 2.80 | 12.00 | 50.00 | 100.00 |
| 4 | 21.30 | 6.09 | 3.04 | 3.25 | 3.32 | 13.00 | 50.00 | 100.00 |
| 5 | 22.70 | 3.24 | 6.49 | 2.97 | 3.29 | 11.30 | 50.00 | 100.00 |
| 6 | 23.89 | 1.71 | 8.53 | 2.28 | 2.58 | 11.00 | 50.00 | 100.00 |
| 7 | 7.64 | 3.82 | 3.82 | 1.64 | 1.92 | 6.14 | 75.00 | 100.00 |
| 8 | 12.99 | 1.62 | 1.62 | 1.27 | 1.85 | 5.65 | 75.00 | 100.00 |
| 9 | 9.72 | 1.62 | 4.86 | 1.39 | 1.40 | 6.00 | 75.00 | 100.00 |
| 10 | 10.65 | 3.04 | 1.52 | 1.62 | 1.66 | 6.50 | 75.00 | 100.00 |
| 11 | 11.35 | 1.62 | 3.24 | 1.49 | 1.65 | 5.65 | 75.00 | 100.00 |
| 12 | 11.95 | 0.85 | 4.27 | 1.14 | 1.29 | 5.50 | 75.00 | 100.00 |

*CFA ash can replace BFS to formulate a new series of TGC cement and concrete compositions.

TABLE 2

Calculated weight percent examples of TGC formulations for cement and concrete using clinoptilolite as a gelation enhancer.

| | Dry Binder | | | Activation Solution | | | | |
|---|---|---|---|---|---|---|---|---|
| # | FFA | Cpt | BFS* | Na2O | SiO2 | H2O | Aggregate | Sum |
| 1 | 23.09 | 7.10 | 5.33 | 2.13 | 1.85 | 10.50 | 50.00 | 100.00 |
| 2 | 27.35 | 4.10 | 2.73 | 2.26 | 2.26 | 11.30 | 50.00 | 100.00 |
| 3 | 21.06 | 10.53 | 3.48 | 1.84 | 1.58 | 11.50 | 50.00 | 100.00 |
| 4 | 23.81 | 3.40 | 6.80 | 2.30 | 1.79 | 11.90 | 50.00 | 100.00 |
| 5 | 24.05 | 6.87 | 3.44 | 1.79 | 1.80 | 12.05 | 50.00 | 100.00 |
| 6 | 11.54 | 3.55 | 2.66 | 1.07 | 0.92 | 5.25 | 75.00 | 100.00 |
| 7 | 13.67 | 2.05 | 1.37 | 1.13 | 1.13 | 5.65 | 75.00 | 100.00 |
| 8 | 10.53 | 5.27 | 1.74 | 0.92 | 0.79 | 5.75 | 75.00 | 100.00 |
| 9 | 11.91 | 1.70 | 3.40 | 1.15 | 0.89 | 5.95 | 75.00 | 100.00 |
| 10 | 12.03 | 3.44 | 1.72 | 0.89 | 0.90 | 6.03 | 75.00 | 100.00 |

*CFA can substitute BFS asa hardening enhancer to formulate a new series of TGC mortar and concrete.

TABLE 3

Calculated weight percent examples of TGC formulations for cement and concrete using dehydrated montmorillonite as a gelation enhancer.

| | Dry Binder | | | Activation Solution | | | | |
|---|---|---|---|---|---|---|---|---|
| # | FFA | D-Mont | BFS* | Na2O | SiO2 | H2O | Aggregate | Sum |
| 1 | 16.10 | 8.05 | 8.05 | 3.08 | 1.58 | 13.15 | 50.00 | 100.00 |
| 2 | 26.07 | 3.26 | 3.26 | 2.75 | 2.07 | 12.60 | 50.00 | 100.00 |
| 3 | 18.51 | 9.25 | 3.48 | 3.15 | 2.06 | 13.55 | 50.00 | 100.00 |
| 4 | 18.99 | 3.17 | 9.50 | 2.69 | 2.38 | 13.28 | 50.00 | 100.00 |
| 5 | 12.20 | 9.15 | 9.15 | 3.15 | 2.39 | 13.95 | 50.00 | 100.00 |
| 6 | 8.05 | 4.02 | 4.02 | 1.54 | 0.79 | 6.58 | 75.00 | 100.00 |
| 7 | 13.03 | 1.63 | 1.63 | 1.37 | 1.03 | 6.30 | 75.00 | 100.00 |
| 8 | 9.25 | 4.63 | 1.74 | 1.57 | 1.03 | 6.78 | 75.00 | 100.00 |
| 9 | 9.50 | 1.58 | 4.75 | 1.34 | 1.19 | 6.64 | 75.00 | 100.00 |
| 10 | 6.10 | 4.58 | 4.58 | 1.58 | 1.19 | 6.98 | 75.00 | 100.00 |

*CFA can substitute BFS as a hardening enhancer to format a new series of TGC mortar and concrete.

NON-LIMITING WORKING EXAMPLES

Example 1 (Table 4)

Figure 1:
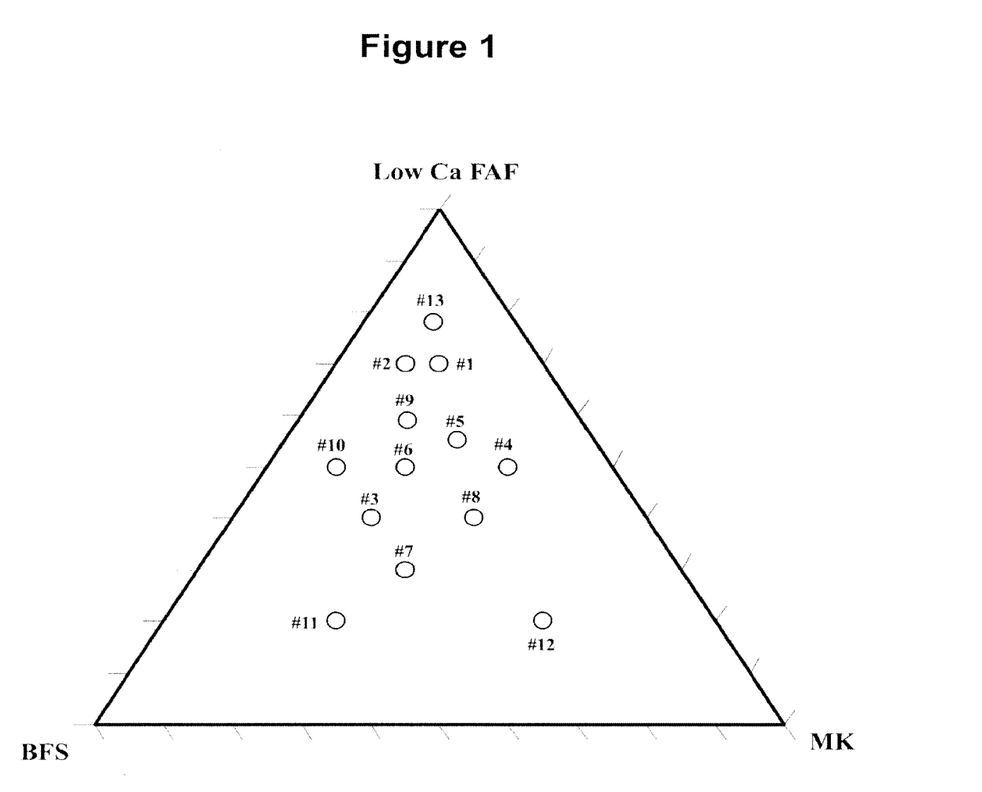
FIG. 1 shows a ternary diagram of TGC compositions with Low Ca Class F fly ash of one embodiment (each number in the plot corresponds to the sample number listed in Table 4).

To make a three-component binder (FIG. 1) for concrete with a Low Ca Class F Fly Ash, the following were mixed:

Orlando fly ash (10.42 wt %),
Mctakaolin (2.23 wt %), and
Ground granulated blast furnace slag (2.23 wt %).

The binder is then mixed with aggregate comprising:
Gravel ASTM C-33 size #7 (48.75 wt %) and
Masonry sand (26.25 wt %).

An activator solution is prepared, comprising:
$Na_2O$ (1.83 wt %),
$SiO_2$ (1.94 wt %), and
$H_2O$ (6.35 wt %)

The materials were obtained from the following sources: metakaolin (Kaorock) from Thiele Kaolin Company, Sandersville, Ga.; ground granulated blast furnace slag (slag cement) from Lafarge North America Inc; Low Ca Class F fly ash from Orlando, Fla. Utilities Unit 2, provided by Headwaters Resources (believed to be about 1.5 wt % CaO).

To make the activator solution, water was mixed with Ru™ sodium silicate solution (PQ Incorporation). The solution as received contains 13.9 wt % $Na_2O$, 33.2 wt % $SiO_2$ and 52.9 wt % water. Then NaOH flake (98 wt % assay) was added to the dilute sodium silicate solution. The activator solution was prepared such that it contains the required amounts of $Na_2O$, $SiO_2$ and $H_2O$ as shown in Tables 1-3. The moisture in the coarse and fine aggregate (masonry sand) was not taken into account. Usually one batch of the TGC freshly mixed concrete weighed about 12 kg. Polybind 300 (Northway Lignin Chemical) was used with Low Ca Class F fly ash based binders as a water reducer and added to the activator solution. The mass of Polybind 300 was 1 wt % of the mass of the pure binder. This is not listed in Table 1 because Polybind 300 was not included in the recipe calculations. The activator solution was mixed under stirring with the binder/gravel/sand mixture until homogeneous. The workability of this paste is greater than 90 minutes and less than 180 minutes.

The paste was filled into cylindrical molds (4 by 8 inches), vibrated while filling for about 5 minutes for bubbles to escape, and then sealed with aluminum foil. Two samples were stored at 25° C. and one at 75° C. for 24 hours, then de-molded and then all three samples stored at 25° C. A certified laboratory measured compressive strength after 7 days. The results are shown in the last two columns of Table 4.

The workability of all following example compositions (Examples 2 to 40) is greater than 90 minutes and less than 180 minutes. The binder composition is shown in a ternary composition diagram in FIG. 1.

Examples 2 to 13 (Table 4)

Using the same procedures as in Example 1, 12 additional samples were prepared whose compositions are given in Table 1. The binder compositions are shown in a ternary composition diagram in FIG. 1.

Example 14 (Table 4)

Figure 2:
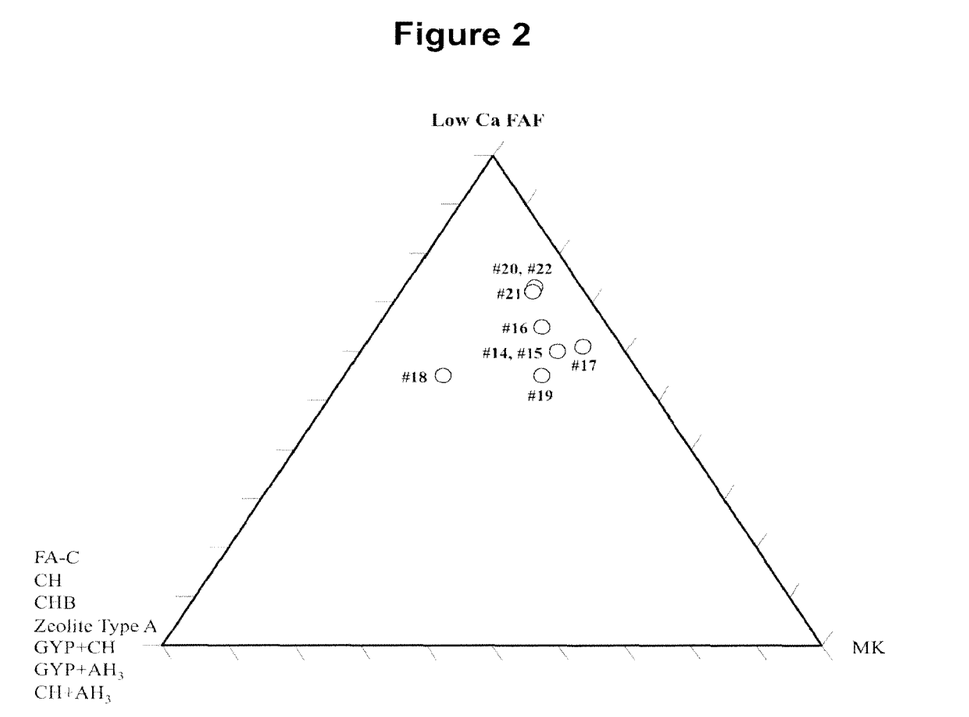
FIG. 2 shows a ternary diagram of TGC compositions with Low Ca Class F fly ash of another embodiment (each number in the plot corresponds to the sample number listed in Table 4 or 5).

Using the same procedures as in Example 1, one sample was prepared substituting Ca-rich clinoptilolite for ground granulated blast furnace slag in the binder. The binder composition is shown in a ternary composition diagram in FIG. 2.

Example 15 (Table 4)

Using the same procedures as in Example 1, one sample was prepared substituting zeolite Type 5A for ground granulated blast furnace slag in the binder. The binder composition is shown in a ternary composition diagram in FIG. 2.

Example 16 (Table 4)

Using the same procedures as in Example 1, one sample was prepared substituting Ca-rich chabazite for ground granulated blast furnace slag in the binder. The binder composition is shown in a ternary composition diagram in FIG. 2.

Example 17 (Table 4)

Using the same procedures as in Example 1, one sample was prepared substituting $Ca(OH)_2$ for ground granulated blast furnace slag in the binder. The binder composition is shown in a ternary composition diagram in FIG. 2.

Examples 18 and 19 (Table 4)

Using the same procedures as in Example 1, one sample was prepared substituting Class C fly ash for ground granulated blast furnace slag in the binder. The binder composition is shown in a ternary composition diagram in FIG. 2.

Example 20 (Table 5)

Using the same procedures as in Example 1, one sample was prepared substituting gypsum and $Ca(OH)_2$ for ground granulated blast furnace slag in the binder. The binder composition is shown in a ternary composition diagram in FIG. 2.

Example 21 (Table 5)

Using the same procedures as in Example 1, one sample was prepared substituting gypsum and $Al(OH)_3$ for ground granulated blast furnace slag in the binder. The binder composition is shown in a ternary composition diagram in FIG. 2.

Example 22 (Table 5)

Using the same procedures as in Example 1, one sample was prepared substituting $Ca(OH)_2$ and $Al(OH)_3$ for ground granulated blast furnace slag in the binder. The binder composition is shown in a ternary composition diagram in FIG. 2.

Examples 23 to 38 (Table 6)

Figure 3:
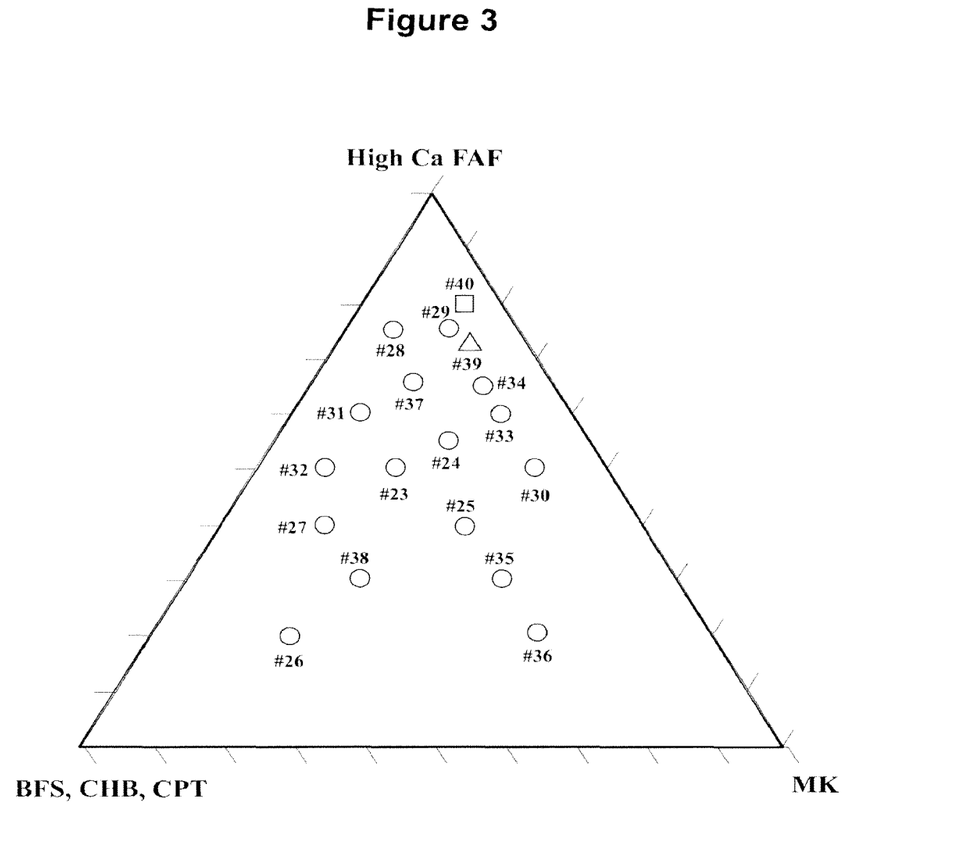
FIG. 3 shows a ternary diagram of TGC compositions with High Ca Class F fly ash of another embodiment (each number in the plot corresponds to the sample number listed in Table 6).

Using the same procedures as in Example 1, 16 different samples were prepared substituting "High Ca Class F Fly Ash," in this case Jewitt fly ash, for "Low Ca Class F Fly Ash." The binder compositions are shown in a ternary composition diagram in FIG. 3. The materials were obtained from the following sources: High Ca Class F fly ash from Limestone Plant, Jewett, Texas Unit #1,2 (believed to have about 12 wt % CaO); Class C fly ash was from Plant A, provided by Headwaters Resources.

Daratard 17 (Grace Construction) was used instead of Polybind 300 with High CaO Class F fly ash based binders as a water reducer. The mass of Daratard 17 was 1 wt % of the mass of the pure binder. This is not listed in Table 6 because Daratard 17 was not included in the recipe calculations.

Example 39 (Table 6)

Using the same procedures as in Example 1, one sample was prepared substituting "High Ca Class F Fly Ash" for "Low Ca Class F Fly Ash" and Ca-rich chabazite for ground granulated blast furnace slag in the binder. The binder composition is shown in a ternary composition diagram in FIG. 3.

Example 40 (Table 6)

Using the same procedures as in Example 1, one sample was prepared substituting "High Ca Class F Fly Ash" for "Low Ca Class F Fly Ash" and Ca-rich clinoptilolite for ground granulated blast furnace slag in the binder. The binder composition is shown in a ternary composition diagram in FIG. 3.

TABLE 4

Example compositions of geo-cement made with "Low Ca Class F Fly Ash"
(Three-component binder; wt %)

| | Binder | | | Aggregate | | Activating Solution | | | 7-Day Strength (psi) Sample cured at: | |
|---|---|---|---|---|---|---|---|---|---|---|
| Example | FA-F | MK | GGBFS | Coarse | Fine | $Na_2O$ | $SiO_2$ | Water | 25° C. | 75° C.* |
| #1 | 10.42 | 2.23 | 2.23 | 48.75 | 26.25 | 1.83 | 1.94 | 6.35 | 8711 | 10541 |
| #2 | 10.76 | 1.54 | 3.07 | 48.75 | 26.25 | 1.72 | 1.86 | 6.05 | 5251 | 6762 |
| #3 | 5.72 | 2.86 | 5.72 | 48.75 | 26.25 | 1.95 | 2.21 | 6.55 | 10183 | 12530 |
| #4 | 6.68 | 4.68 | 2.00 | 48.75 | 26.25 | 2.14 | 2.84 | 6.65 | 9447 | 9944 |
| #5 | 7.87 | 3.58 | 2.86 | 48.75 | 26.25 | 1.94 | 2.36 | 6.40 | 11535 | 10024 |
| #6 | 7.23 | 2.89 | 4.34 | 48.75 | 26.25 | 1.94 | 2.16 | 6.45 | 8950 | 9745 |
| #7 | 4.15 | 4.15 | 5.53 | 48.75 | 26.25 | 2.14 | 2.68 | 6.35 | 6006 | 10233 |
| #8 | 5.43 | 4.76 | 3.40 | 48.75 | 26.25 | 2.24 | 2.72 | 6.45 | 9944 | 10024 |
| #9 | 9.02 | 2.25 | 3.76 | 48.75 | 26.25 | 1.85 | 2.07 | 6.05 | 4773 | 10541 |
| #10 | 7.77 | 1.55 | 6.22 | 48.75 | 26.25 | 1.81 | 1.80 | 5.85 | 7180 | 10223 |
| #11 | 2.84 | 3.55 | 7.82 | 48.75 | 26.25 | 1.93 | 2.50 | 6.35 | 10541 | 10233 |
| #12 | 2.45 | 6.75 | 3.07 | 48.75 | 26.25 | 2.55 | 3.44 | 6.75 | 7955 | 9507 |
| #13 | 12.42 | 1.27 | 2.23 | 48.75 | 26.25 | 1.58 | 1.75 | 5.75 | — | 5131 |
| Example | FA-F | MK | CPT | Coarse | Fine | $Na_2O$ | $SiO_2$ | Water | 25° C. | 75° C. |
| #14 | 8.32 | 4.16 | 1.39 | 48.75 | 26.25 | 2.15 | 2.53 | 6.45 | 9547 | 11177 |

TABLE 4-continued

Example compositions of geo-cement made with "Low Ca Class F Fly Ash"
(Three-component binder; wt %)

| | Binder | | | Aggregate | | Activating Solution | | | Sample cured at: 7-Day Strength (psi) | |
|---|---|---|---|---|---|---|---|---|---|---|
| Example | FA-F | MK | Type 5A | Coarse | Fine | Na$_2$O | SiO$_2$ | Water | 25° C. | 75° C. |
| #15 | 9.23 | 3.55 | 1.42 | 48.75 | 26.25 | 2.06 | 2.40 | 6.35 | 4972 | 6364 |
| Example | FA-F | MK | CHB | Coarse | Fine | Na$_2$O | SiO$_2$ | Water | 25° C. | 75° C. |
| #16 | 9.29 | 3.57 | 1.43 | 48.75 | 26.25 | 2.06 | 2.20 | 6.45 | 7961 | 9228 |
| Example | FA-F | MK | CH | Coarse | Fine | Na$_2$O | SiO$_2$ | Water | 25° C. | 75° C. |
| #17 | 8.31 | 4.56 | 0.80 | 48.75 | 26.25 | 1.84 | 2.93 | 6.55 | 7955 | 10780 |
| Example | FA-F | MK | FA-C | Coarse | Fine | Na$_2$O | SiO$_2$ | Water | 25° C. | 75° C. |
| #18 | 8.21 | 2.24 | 4.48 | 48.75 | 26.25 | 1.78 | 3.00 | 6.25 | 5807 | 11296 |
| #19 | 7.53 | 4.11 | 2.05 | 48.75 | 26.25 | 2.08 | 3.34 | 6.60 | 7955 | 12370 |

*For 24 hours, then at 25° C.

Table 4 legend:
FA-F = Low Ca Class F Fly Ash;
MK = Metakaolin-GGBFS;
Ground Granulated Blast Furnace Slag;
CPT = Ca-rich Clinoplitolite;
CHB = Ca-rich Chabazite;
CH = Ca(OH)$_2$;
Fly Ash FA-C = Class C;
Type 5A = Zeolite Type 5A;
Aggregate: Coarse = ASTM C-33 size #7 and Fine = Masonry sand

TABLE 5

Example compositions of geo-cement made with "Low Ca Class F fly ash"
(Four-component binder, wt %)

| | Binder | | | | Aggregate | | Activating Solution | | | Sample cured at: 7-Day Strength (psi) | |
|---|---|---|---|---|---|---|---|---|---|---|---|
| Example | FA-F | MK | GYP | CH | Coarse | Fine | Na$_2$O | SiO$_2$ | Water | 25° C. | 75° C.* |
| #20 | 10.76 | 2.99 | 0.60 | 0.60 | 48.75 | 26.25 | 1.75 | 2.81 | 6.25 | 5171 | 8910 |
| Example | FA-F | MK | GYP | AH$_3$ | Coarse | Fine | Na$_2$O | SiO$_2$ | Water | 25° C. | 75° C. |
| #21 | 10.76 | 2.99 | 0.60 | 0.60 | 48.75 | 26.25 | 1.75 | 2.81 | 6.25 | 3978 | 8313 |
| Example | FA-F | MK | CH | AH$_3$ | Coarse | Fine | Na$_2$O | SiO$_2$ | Water | 25° C. | 75° C. |
| #22 | 10.77 | 2.95 | 0.59 | 0.44 | 48.75 | 26.25 | 1.77 | 3.09 | 6.25 | 5768 | 10223 |

*For 24 hours, then at 25° C.

Table 5 legend:
FA-F = Low Ca Class F Fly Ash;
MK = Metakaolin;
CH = Ca(OH)$_2$;
AH$_3$ = Al(OH)$_3$;
FA-C = Fly Ash Class C;
GPY = Gypsum;
Aggregate: Coarse = ASTM C-33 size #7 and Fine = Masonry sand

TABLE 6

Example compositions of geo-cement made with "High Ca Class F fly ash"
(Three-component binder)

| | Binder | | | Aggregate | | Activating Solution | | | 7-Day Strength (psi) Sample cured at: | |
|---|---|---|---|---|---|---|---|---|---|---|
| Example | FA-F | MK | GGBFS | Coarse | Fine | $Na_2O$ | $SiO_2$ | Water | 25° C. | 75° C.* |
| #23 | 7.48 | 2.99 | 4.49 | 48.75 | 26.25 | 1.92 | 2.37 | 5.75 | 8910 | 12331 |
| #24 | 8.10 | 3.68 | 2.95 | 48.75 | 26.25 | 1.90 | 2.52 | 5.85 | 7959 | 10342 |
| #25 | 5.54 | 4.84 | 3.46 | 48.75 | 26.25 | 2.08 | 2.88 | 6.20 | 7478 | 10740 |
| #26 | 3.01 | 3.01 | 9.02 | 48.75 | 26.25 | 1.83 | 2.29 | 5.85 | 6563 | 10084 |
| #27 | 6.28 | 2.36 | 7.07 | 48.75 | 26.25 | 1.65 | 1.98 | 5.65 | 7399 | 11138 |
| #28 | 12.82 | 1.20 | 3.08 | 48.75 | 26.25 | 1.39 | 1.66 | 4.85 | 5171 | 10581 |
| #29 | 12.09 | 2.42 | 1.61 | 48.75 | 26.25 | 1.62 | 2.11 | 5.15 | 6722 | 13524 |
| #30 | 6.83 | 5.46 | 1.37 | 48.75 | 26.25 | 2.26 | 3.02 | 6.05 | 10064 | 10422 |
| #31 | 9.78 | 1.63 | 4.89 | 48.75 | 26.25 | 1.60 | 1.85 | 5.25 | 5370 | 13126 |
| #32 | 7.94 | 1.59 | 6.35 | 48.75 | 26.25 | 1.70 | 1.82 | 5.60 | 6563 | 11933 |
| #33 | 8.51 | 4.26 | 1.42 | 48.75 | 26.25 | 2.03 | 2.79 | 5.99 | 6563 | 10740 |
| #34 | 9.51 | 3.66 | 1.46 | 48.75 | 26.25 | 2.00 | 2.58 | 5.80 | 5768 | 11337 |
| #35 | 3.91 | 5.87 | 3.26 | 48.75 | 26.25 | 2.30 | 3.20 | 6.45 | 8353 | 9308 |
| #36 | 2.49 | 6.84 | 3.11 | 48.75 | 26.25 | 2.47 | 3.44 | 6.65 | 10103 | 9547 |
| #37 | 10.38 | 2.40 | 3.19 | 48.75 | 26.25 | 1.68 | 2.10 | 5.25 | 9547 | 12013 |
| #38 | 4.40 | 3.67 | 6.61 | 48.75 | 26.25 | 1.90 | 2.42 | 6.00 | 9904 | 11297 |
| Example | FA-F | MK | CHB | Coarse | Fine | $Na_2O$ | $SiO_2$ | Water | 25° C. | 75° C. |
| #39 | 11.16 | 3.10 | 1.24 | 48.75 | 26.25 | 1.78 | 2.27 | 5.45 | 6364 | 10700 |
| Example | FA-F | MK | CPT | Coarse | Fine | $Na_2O$ | $SiO_2$ | Water | 25° C. | 75° C. |
| #40 | 12.63 | 2.37 | 0.79 | 48.75 | 26.25 | 1.67 | 2.09 | 5.45 | 3699 | 5967 |

*For 24 hours, then at 25° C.
Table 6 legend:
FA-F = High Ca Class F Fly Ash;
MK = Metakaolin;
GGBFS = Ground Granulated Blast Furnace Slag;
CPT = Ca-rich Clinoptilolite;
CHB = Ca-rich Chabazite;
Aggregate: Coarse = ASTM #7 and Fine = Masonry sand The foregoing description of the embodiments of the invention has been presented for purposes of illustration and description. It is not intended to be exhaustive or to limit the invention to the precise form disclosed, and modifications and variations are possible in light of the above teaching or may be acquired from practice of the invention. The embodiments were chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents. All references cited herein, including U.S. Pat. Nos. 5,435,843, 4,509,985 and 5,601,643, and US published patent application U.S. 2007/0125272 A1 are incorporated by reference in their entirety.

What is claimed:

1. A geopolymer concrete mix composition, comprising:
    a dry binder mixture including
        a fly ash material in an amount of about 15 wt % to about 90 wt % of the dry binder mixture;
        a gelation enhancer in an amount of about 5 wt % to about 80 wt % of the dry binder mixture; and
        a hardening enhancer in an amount of about 5 wt % to about 80 wt % of the dry binder mixture;
    a liquid alkaline activator solution;
    a fine aggregate; and
    a coarse aggregate, and
    wherein the geopolymer concrete mixture has a setting time of longer than 1-hour.

2. The geopolymer concrete mix composition of claim 1, wherein the fly ash material is a Class F fly ash material.

3. The geopolymer concrete mix composition of claim 1, wherein the gelation enhancer is selected from the group consisting of metakaolin, micron or nano sized soluble silica particles, a dehydrated or partially dehydrated alkali-rich zeolitic phase, colloidal alumina, sodium aluminate, aluminum hydroxide, natural pozzolanic materials, volcanic ash, tuff, ground waste glasses, and combinations thereof.

4. The geopolymer concrete mix composition of claim 1, wherein the hardening enhancer is selected from the group consisting of blast furnace slag, Class C fly ash, gypsum, flue gas desulfurization (FGD) gypsum, calcium rich zeolite material, calcium silicate, calcium aluminate, kiln dust, bottom ash, vitreous calcium aluminosilicate (VCAS), calcium hydroxide, aluminum hydroxide, dissolved aluminate, calcium chloride, reactive magnesium oxide, magnesium hydroxide, and combinations thereof.

5. The geopolymer concrete mix composition of claim 1, wherein the gelation enhancer comprises metakaolin.

6. The geopolymer concrete mix composition of claim 1, further comprising:
    a setting modifier, wherein the setting modifier is selected from the group consisting of boric acid, borax, a nitrate salt, phosphoric acid, sodium sulfate, sodium phosphate, calcium chloride, sodium citrate, and combinations thereof.

7. The geopolymer concrete mix composition of claim 1, wherein the fly ash material comprises at least about 50 wt % to about 90 wt % of the dry binder mixture;
the gelation enhancer comprises about 5 wt % to about 50 wt % of the dry binder mixture; and
the hardening enhancer comprises about 5 wt % to about 50 wt % of the dry binder mixture.

8. The geopolymer concrete mix composition of claim 1, wherein
the activator alkaline solution comprises a metal hydroxide, a metal silicate, and water,
the metal hydroxide is selected from a group consisting of sodium hydroxide, lithium hydroxide, potassium hydroxide, and combinations thereof, and
the metal silicate is selected from a group consisting of sodium silicate, potassium silicate, and combinations thereof.

9. The geopolymer concrete mix composition of claim 1, wherein
the liquid alkaline activator solution comprises a first $SiO_2$ component, a second $SiO_2$ component, and a third $SiO_2$ component;
the first $SiO_2$ component comprises $SiO_2$ in an amount such that a $SiO_2/Al_2O_3$ molar ratio of the combined gelation enhancer and the first $SiO_2$ component ranges from about 2.5 to about 6.0;
the second $SiO_2$ component comprises $SiO_2$ in an amount such that a $SiO_2$ mass fraction of the second $SiO_2$ component relative to the fly ash ranges from about 0.01 to about 0.15; and
the third $SiO_2$ component comprises $SiO_2$ in an amount such that a $SiO_2$ mass fraction of the third $SiO_2$ component relative to the hardening enhancer ranges from about 0.01 to about 0.15.

10. The geopolymer concrete mix composition of claim 1, wherein:
the liquid alkaline activator solution comprises a first $H_2O$ component, a second $H_2O$ component, a third $H_2O$ component, and $M_2O$, where M is an alkali metal;
the first $H_2O$ component comprises $H_2O$ in an amount such that a $H_2O/M_2O$ molar ratio of the combined gelation enhancer and first $H_2O$ component ranges from about 5 to 18;
the second $H_2O$ component comprises $H_2O$ in an amount such that a $H_2O$ mass fraction of the second $H_2O$ component relative to the fly ash ranges from about 0.2 to about 0.6; and
the third $H_2O$ component comprises $H_2O$ in an amount such that a $H_2O$ mass fraction of the third $H_2O$ component relative to the hardening enhancer ranges from about 0.2 to about 0.6.

11. The geopolymer concrete mix composition of claim 1, wherein
the liquid alkaline activator solution is a of water, $Na_2O$ and $SiO_2$;
a weight ratio of the water to combined solids in the dry binder mixture and the liquid alkaline activator solution ranges from about 0.12 to about 0.8;
a weight ratio of the $Na_2O$ to the combined solids in the dry binder mixture and the liquid alkaline activator solution ranges from about 0.01 to about 0.25;
a weight ratio of the $SiO_2$ to the combined solids of the dry binder mixture and the liquid alkaline activator solution ranges from about 0.01 to about 0.25;
a weight ratio of the liquid alkaline activator solution to the combined solids in the dry binder mixture and the liquid alkaline activator solution ranges from about 0.20 to about 0.85; and a weight ratio of the $SiO_2$ to the $Na_2O$ ranges from about 0.1 to about 2.0.

12. The geopolymer concrete mix composition of claim 1, wherein
the fly ash material is a Class F fly ash material in an amount of about 2 wt % to about 50 wt % of the concrete mixture;
the gelation enhancer is in an amount of about 0.6 wt % to about 15 wt % of the concrete mixture;
the hardening enhancer is in an amount of about 0.6 wt % to about 17 wt % of the concrete mixture;
the liquid alkaline activator solution is prepared by mixing alkali hydroxide, alkali silicate liquid and water or dissolving soluble silica in alkali hydroxide solution in such an appropriate proportion to form a of water, $Na_2O$ and $SiO_2$;
the $Na_2O$ is in an amount of about 0.8 wt % to about 7.5 wt % of the concrete mixture;
the $SiO_2$ is in an amount of about 0.6 wt % to about 15 wt % of the concrete mixture;
the water is in an amount of about 3.55 wt % to about 25 wt % of the concrete mixture; and
a total aggregate content is in an amount of about 25 wt % to about 85 wt % of the concrete mixture,
the total aggregate content including the fine aggregate and the course aggregate.

13. The geopolymer concrete mix composition of claim 12, wherein
the Class F fly ash material is in an amount of about 5 wt % to about 30 wt % of the concrete mixture;
the gelation enhancer is in an amount of about 1.3 wt % to about 12 wt % of the concrete mixture;
the hardening enhancer is in an amount of about 1.5 wt % to about 13 wt % of the concrete mixture;
the $Na_2O$ is in an amount of about 0.9 wt % to about 5 wt % of the concrete mixture;
the $SiO_2$ is in an amount of about 1 wt % to about 9 wt % of the concrete mixture;
the water is in an amount of about 4.5 wt % to about 15 wt % of the concrete mixture; and
the total aggregate content is in an amount of about 40 wt % to about 85 wt % of the concrete mixture.

14. The geopolymer concrete mix composition of claim 12, wherein
the Class F fly ash material is in an amount of about 5 wt % to about 30 wt % of the concrete mixture;
the gelation enhancer is in an amount of about 0.6 wt % to about 10 wt % of the concrete mixture;
the hardening enhancer is in an amount of about 0.6 wt % to about 10 wt % of the concrete mixture;
the $Na_2O$ is in an amount of about 0.8 wt % to about 5 wt % of the concrete mixture;
the $SiO_2$ is in an amount of about 0.6 wt % to about 6 wt % of the concrete mixture;
the water is in an amount of about 3.55 wt % to about 15 wt % of the concrete mixture; and
the total aggregate content is in an amount of about 50 wt % to about 85 wt % of the concrete mixture.

15. The geopolymer concrete mix composition of claim 5, wherein the hardening enhancer comprises blast furnace slag, Class C fly ash, or combinations thereof.

16. The geopolymer concrete mix composition of claim 15, wherein the liquid alkaline activator solution comprises $SiO_2$, $H_2O$ and $M_2O$, where M is an alkali metal.

17. The geopolymer concrete mix composition of claim 16, wherein $M_2O$ is $Na_2O$, and wherein a weight ratio of the Na$_2$O to the combined solids in the dry binder mixture and the liquid alkaline activator solution ranges from about 0.01 to about 0.25;

a weight ratio of the SiO$_2$ to the combined solids of the dry binder mixture and the liquid alkaline activator solution ranges from about 0.01 to about 0.25;

a weight ratio of the liquid alkaline activator solution to the combined solids in the dry binder mixture and the liquid alkaline activator solution ranges from about 0.20 to about 0.85; and a weight ratio of the SiO$_2$ to the Na$_2$O ranges from greater than 1.2 to about 2.0.

18. The geopolymer concrete mix composition of claim 15, wherein
the fly ash material that comprises less than or equal to 15 wt % of calcium oxide is in the amount of about 50 wt % to about 80 wt % of the dry binder mixture;
the gelation enhancer is in the amount of 10 to 25 wt % of the dry mixture, and
the at least one hardening enhancer is in the amount of 10 to 25 wt % of the dry mixture.

19. The geopolymer concrete mix composition of claim 1, wherein the hardening enhancer is in an amount of more than 20 wt % of the dry binder mixture.

20. A fresh geopolymer concrete formed from the geopolymer concrete mix composition of claim 1, wherein the fresh geopolymer concrete is workable for longer than 60 minutes after the addition of the liquid alkaline activator solution.

21. The fresh geopolymer concrete of claim 20, wherein the fresh geopolymer concrete is workable for 1.5 to 6 hours after the addition of the liquid alkaline activator solution.

22. The fresh geopolymer concrete of claim 20, being workable for greater than 60 minutes and less than 360 minutes after the addition of the liquid alkaline activator solution.

23. The fresh geopolymer concrete of claim 22, having a seven day compressive strength of at least 5,000 psi.

24. A geopolymer concrete prepared by a process comprising:
forming a fresh geopolymer concrete from the geopolymer concrete mix composition of claim 1;
setting the fresh geopolymer concrete at a temperature of 20° C. to 75° C. for a setting time of longer than 60 minutes after said forming to form a set geopolymer concrete, wherein the fresh geopolymer concrete is workable during the setting time; and
curing the set geopolymer concrete paste composition at a temperature of 20° C. to 75° C. for at least 24 hours to form the geopolymer concrete.

25. A method of forming a geopolymer concrete, comprising:
mixing a dry binder mixture, a liquid alkaline activator solution, a fine aggregate, and a coarse aggregate to form a geopolymer concrete mix composition;
setting the geopolymer concrete mix composition at a temperature of 20° C. to 75° C. for longer than 60 minutes to form a set geopolymer concrete mixture; and
curing the set geopolymer concrete at a temperature of 20° C. to 75° C. for at least 24 hours,
wherein the dry binder mixture includes
a fly ash material in an amount of about 15 wt % to about 90 wt % of the dry mixture, the fly ash material comprising less than or equal to 15 wt % of calcium oxide;
a gelation enhancer in an amount of about 5 wt % to about 80 wt % of the dry mixture; and
a hardening enhancer in an amount of about 5 wt % to about 80 wt % of the dry mixture, the hardening enhancer having a composition different from a composition of the fly ash material.

26. The method of forming a geopolymer concrete of claim 25, further comprising:
mixing a setting modifier with the geopolymer concrete mixture,
wherein the setting modifier is selected from a group consisting of boric acid, borax, a nitrate salt, phosphoric acid, sodium sulfate, sodium phosphate, calcium chloride, sodium citrate, and combinations thereof.

27. The method of forming a geopolymer concrete of claim 25, further comprising:
providing the geopolymer concrete mixture into a building or a road under construction, wherein mixing the dry binder mixture, the liquid alkaline activator solution, the fine aggregate, and the coarse aggregate occurs at a site of the building or road under construction.

* * * * *